US008936117B2

(12) United States Patent
Vail

(10) Patent No.: US 8,936,117 B2
(45) Date of Patent: *Jan. 20, 2015

(54) METHODS OF FABRICATING POLYCRYSTALLINE DIAMOND ELEMENTS AND COMPACTS USING SP2-CARBON-CONTAINING PARTICLES

(75) Inventor: Michael A. Vail, Genola, UT (US)

(73) Assignee: US Synthetic Corporation, Orem, UT (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/533,026

(22) Filed: Jun. 26, 2012

(65) Prior Publication Data
US 2012/0267174 A1 Oct. 25, 2012

Related U.S. Application Data

(63) Continuation of application No. 13/116,511, filed on May 26, 2011, now Pat. No. 8,246,701, which is a continuation of application No. 12/394,594, filed on Feb. 27, 2009, now Pat. No. 7,972,397, which is a continuation of application No. 11/496,905, filed on Jul. 31, 2006, now Pat. No. 7,516,804.

(51) Int. Cl.
E21B 10/36 (2006.01)
B24D 3/10 (2006.01)
E21B 10/567 (2006.01)
(Continued)

(52) U.S. Cl.
CPC ............... B24D 3/10 (2013.01); E21B 10/567 (2013.01); C04B 35/52 (2013.01); C04B 35/645 (2013.01); B22F 7/06 (2013.01); C22C 26/00 (2013.01); C04B 2235/427 (2013.01); C04B 2235/5436 (2013.01); C04B 2235/5454 (2013.01); C04B 2235/5472 (2013.01); C04B 2235/77 (2013.01);
(Continued)

(58) Field of Classification Search
USPC .................................. 75/243; 175/420.2, 434
See application file for complete search history.

(56) References Cited

U.S. PATENT DOCUMENTS 3,745,623 A 7/1973 Wentorf, Jr. et al.
4,104,441 A 8/1978 Fedoseev
(Continued)

FOREIGN PATENT DOCUMENTS

DE 268888 A 6/1989
EP 0715930 6/1996
(Continued)

OTHER PUBLICATIONS

U.S. Appl. No. 12/245,573, filed Oct. 3, 2008, Sani.
(Continued)

Primary Examiner — George Wyszomierski
Assistant Examiner — Ngoclan T Mai
(74) Attorney, Agent, or Firm — Dorsey & Whitney LLP

(57) ABSTRACT

In an embodiment, a polycrystalline diamond compact includes a polycrystalline diamond table having nanocrystalline diamond present in an amount greater than zero weight percent to about 5 weight percent of the polycrystalline diamond table. The polycrystalline diamond table including a catalyst material distributed throughout at least a portion thereof. The polycrystalline diamond compact includes a substrate bonded to the polycrystalline diamond table.

25 Claims, 4 Drawing Sheets

(51) Int. Cl.
*C04B 35/52* (2006.01)
*C04B 35/645* (2006.01)
*B22F 7/06* (2006.01)
*C22C 26/00* (2006.01)
*C22C 29/06* (2006.01)
*B22F 5/00* (2006.01)

(52) U.S. Cl.
CPC ............ *C22C 29/06* (2013.01); *B22F 2005/001* (2013.01)
USPC .......... 175/428; 175/420.2; 175/434; 75/243; 428/698

(56) References Cited

U.S. PATENT DOCUMENTS

| | | | |
|---|---|---|---|
| 4,246,005 A | 1/1981 | Ishizuka | |
| 4,268,276 A | 5/1981 | Bovenkerk | |
| 4,274,900 A | 6/1981 | Mueller et al. | |
| 4,410,054 A | 10/1983 | Nagel et al. | |
| 4,425,315 A | 1/1984 | Tsuji et al. | |
| 4,468,138 A | 8/1984 | Nagel | |
| 4,560,014 A | 12/1985 | Geczy | |
| 4,636,253 A | 1/1987 | Nakai et al. | |
| 4,738,322 A | 4/1988 | Hall et al. | |
| 4,797,241 A | 1/1989 | Peterson et al. | |
| 4,811,801 A | 3/1989 | Salesky et al. | |
| 4,913,247 A | 4/1990 | Jones | |
| 5,016,718 A | 5/1991 | Tandberg | |
| 5,087,435 A | 2/1992 | Potter et al. | |
| 5,092,687 A | 3/1992 | Hall | |
| 5,120,327 A | 6/1992 | Dennis | |
| 5,128,080 A | 7/1992 | Jurewicz | |
| 5,135,061 A | 8/1992 | Newton, Jr. | |
| 5,154,245 A | 10/1992 | Waldenstrom et al. | |
| 5,209,916 A | 5/1993 | Gruen | |
| 5,328,676 A | 7/1994 | Gruen | |
| 5,364,192 A | 11/1994 | Damm et al. | |
| 5,368,398 A | 11/1994 | Damm et al. | |
| 5,370,855 A | 12/1994 | Gruen | |
| 5,449,491 A | 9/1995 | Job | |
| 5,460,233 A | 10/1995 | Meany et al. | |
| 5,462,776 A | 10/1995 | Gruen | |
| 5,467,836 A | 11/1995 | Grimes et al. | |
| 5,480,233 A | 1/1996 | Cunningham | |
| 5,544,713 A | 8/1996 | Dennis | |
| 5,620,512 A | 4/1997 | Gruen et al. | |
| 5,759,216 A | 6/1998 | Kanada et al. | |
| 5,900,225 A | 5/1999 | Mistry et al. | |
| 5,954,147 A | 9/1999 | Overstreet et al. | |
| 6,214,079 B1 | 4/2001 | Kear et al. | |
| 6,398,815 B1 | 6/2002 | Pope et al. | |
| 6,544,308 B2 | 4/2003 | Griffin et al. | |
| 6,783,745 B1 | 8/2004 | Vornov et al. | |
| 6,793,681 B1 | 9/2004 | Pope et al. | |
| 6,800,095 B1 | 10/2004 | Pope et al. | |
| 6,883,623 B2 | 4/2005 | McCormick et al. | |
| 7,048,081 B2 | 5/2006 | Smith et al. | |
| 7,060,641 B2 | 6/2006 | Qian et al. | |
| 7,070,635 B2 * | 7/2006 | Frushour .................... | 51/309 |
| 7,350,599 B2 | 4/2008 | Lockwood et al. | |
| 7,516,804 B2 | 4/2009 | Vail | |
| 7,517,588 B2 | 4/2009 | Frushour | |
| 7,569,176 B2 | 8/2009 | Pope et al. | |
| 7,635,035 B1 | 12/2009 | Bertagnolli | |
| 7,841,428 B2 | 11/2010 | Bertagnolli | |
| 7,842,111 B1 | 11/2010 | Sani | |
| 7,972,397 B2 | 7/2011 | Vail | |
| 2004/0011433 A1 | 1/2004 | Shiozaki et al. | |
| 2004/0057896 A1 | 3/2004 | Kronholm et al. | |
| 2005/0002851 A1* | 1/2005 | McElrath et al. .......... | 423/447.3 |
| 2005/0019114 A1 | 1/2005 | Sung | |
| 2005/0133277 A1* | 6/2005 | Dixon ........................ | 175/426 |
| 2005/0186104 A1 | 8/2005 | Kear et al. | |
| 2005/0227590 A1 | 10/2005 | Sung | |
| 2006/0016127 A1 | 1/2006 | Sung | |
| 2006/0042172 A1 | 3/2006 | Sung | |
| 2006/0060390 A1 | 3/2006 | Eyre | |
| 2006/0060392 A1 | 3/2006 | Eyre | |
| 2006/0086540 A1 | 4/2006 | Griffin et al. | |
| 2006/0147644 A1 | 7/2006 | Fujimura et al. | |
| 2006/0157285 A1 | 7/2006 | Cannon et al. | |
| 2006/0266559 A1 | 11/2006 | Keshavan et al. | |
| 2007/0056778 A1 | 3/2007 | Webb et al. | |
| 2007/0144790 A1 | 6/2007 | Fang et al. | |
| 2007/0189153 A1 | 8/2007 | Mason | |
| 2007/0234646 A1 | 10/2007 | Can et al. | |
| 2007/0272448 A1 | 11/2007 | Griffo | |
| 2008/0085407 A1 | 4/2008 | Cooley et al. | |
| 2008/0115424 A1 | 5/2008 | Can et al. | |
| 2009/0152015 A1 | 6/2009 | Sani et al. | |
| 2009/0178345 A1 | 7/2009 | Russell et al. | |
| 2010/0104874 A1 | 4/2010 | Yong et al. | |
| 2011/0225896 A1 | 9/2011 | Vail | |
| 2013/0269263 A1 | 10/2013 | Vail | |

FOREIGN PATENT DOCUMENTS

| | | |
|---|---|---|
| EP | 07872564.5 | 5/2009 |
| EP | 07872564.5 | 6/2011 |
| FR | 2684090 | 5/1993 |
| RU | 2131763 | 6/1999 |
| WO | WO99/10274 | 3/1999 |
| WO | WO2008/094190 | 8/2008 |

OTHER PUBLICATIONS

U.S. Appl. No. 12/909,716, filed Oct. 21, 2010, Bertagnolli.
U.S. Appl. No. 12/912,273, filed Oct. 26, 2010, Sani.
Akaishi, Minoru, Yoiciro Sato, Nobuo Setaka, Masayuki Tsutsumi, Toshikazu Ohsawa and Osamu Fukunaga, "Effect of Additive Graphite on Sitering of Diamond", Cermaic Bulletin, vol. 62, No. 6 (1983) pp. 689-694.
Asbury Carbons, "Amorphous Graphite", http://asbury.com/Amorphous-Graphite.html (Mar. 28, 2008) (May 16, 2012) (obtainied via Internet Archive Wayback Machine).
Davidenko, V.M, S.V. Kidalov, F.M. Shakhov, M.A. Yagovkina, V.A. Yashin, V.YA.Vul, "Fullerenes as a co-catalyst for high pressure-high temperature synthesis of diamonds", Diamond and Related Materials 13 (2004) pp. 2203-2206.
Kidalov,S.V., V.I. Sokolov, F.M. Shakhov and A. YA. Vul', "Mechanism of the Catalytic Effect of Fullerenes on the Graphite-Diamond Phase Transition at High Temperature and Pressure", Doklady Physical Chemistry, vol. 404, Part 1, (2005) pp. 179-181.
Vul, A. YA, V.M. Davidenko, S.V. Kidalov, S.S. Ordan'Yan and V.A. Yashin, "Fullereness Catalyze the Graphite-Diamond Phase Transition", Technical Physics Letters, vol. 27, No. 5, 2001, pp. 384-386.
Vul, A. YA, S.V. Kidalov, V.M. Davidenko, V.A. Yashin, S.S. Ordanyan, "Fullerness as a co-catalyst for HPHT Synthesis of Diamond", Proceedings of the Sixth Applied Diamond Conference/Second (2001) pp. 237-238.
Yushin, G.N. et al., "Effect of sintering in structure of nanodiamond," Diamond and Related Materials, Aug. 10, 2005, vol. 14, pp. 1721-1729.
International Search Report and Written Opinion from International Application No. PCT/US2007/016322 dated Oct. 17, 2008.
U.S. Appl. No. 11/496,905, Apr. 17, 2008, Office Action.
U.S. Appl. No. 11/496,905, Oct. 30, 2008, Office Action.
U.S. Appl. No. 11/496,905, Jan. 15, 2009, Notice of Allowance.
U.S. Appl. No. 11/496,905, Mar. 25, 2009, Issue Notification.
U.S. Appl. No. 11/351,564, May 27, 2008, Office Action.
U.S. Appl. No. 11/351,564, Sep. 17, 2008, Office Action.
U.S. Appl. No. 11/351,564, Mar. 4, 2009, Office Action.
U.S. Appl. No. 11/351,564, Jun. 24, 2009, Office Action.
U.S. Appl. No. 11/351,564, Dec. 30, 2009, Notice of Allowance.
U.S. Appl. No. 11/351,564, Apr. 15, 2010, Notice of Allowance.
U.S. Appl. No. 11/351,564, Jul. 21, 2010, Notice of Allowance.
U.S. Appl. No. 11/351,564, Nov. 10, 2010, Issue Notification.
U.S. Appl. No. 12/111,769, Dec. 23, 2009, Office Action.
U.S. Appl. No. 12/111,769, Mar. 11, 2010, Office Action.

(56) References Cited

OTHER PUBLICATIONS

U.S. Appl. No. 12/111,769, Jul. 28, 2010, Notice of Allowance.
U.S. Appl. No. 12/111,769, Aug. 20, 2010, Notice of Allowance.
U.S. Appl. No. 12/111,769, Nov. 10, 2010, Issue Notification.
U.S. Appl. No. 12/394,594, filed Oct. 1, 2010, Office Action.
U.S. Appl. No. 12/394,594, Dec. 22, 2010, Office Action.
U.S. Appl. No. 12/394,594, Mar. 31, 2011, Notice of Allowance.
U.S. Appl. No. 12/394,594, Jun. 15, 2011, Issue Notification.
U.S. Appl. No. 12/245,573, Jun. 17, 2011, Office Action.
U.S. Appl. No. 12/245,573, Oct. 26, 2011, Office Action.
U.S. Appl. No. 12/245,573, Jun. 11, 2012, Office Action.
U.S. Appl. No. 12/909,716, Feb. 14, 2012, Office Action.
U.S. Appl. No. 13/116,511, Dec. 9, 2011, Office Action.
U.S. Appl. No. 13/116,511, Mar. 30, 2012, Notice of Allowance.
U.S. Appl. No. 12/245,573, Feb. 6, 2014, Office Action.
U.S. Appl. No. 12/912,273, Oct. 25, 2013, Notice of Allowance.
U.S. Appl. No. 12/912,273, Mar. 3, 2014, Notice of Allowance.
U.S. Appl. No. 12/912,273, Apr. 8, 2014, Notice of Allowance.
U.S. Appl. No. 12/912,273, May 7, 2014, Issue Notification.

* cited by examiner

METHODS OF FABRICATING POLYCRYSTALLINE DIAMOND ELEMENTS AND COMPACTS USING SP2-CARBON-CONTAINING PARTICLES

CROSS-REFERENCE TO RELATED APPLICATIONS

This application is a continuation of application Ser. No. 13/116,511 filed on 26 May 2011, which is a continuation of application Ser. No. 12/394,594 filed on 27 Feb. 2009 (now U.S. Pat. No. 7,972,397), which is a continuation of application Ser. No. 11/496,905 filed on 31 Jul. 2006 (now U.S. Pat. No. 7,516,804). Each of the foregoing applications is incorporated, in its entirety, by this reference.

TECHNICAL FIELD

The present invention relates to superabrasive materials, apparatuses, and methods of manufacturing same, such as polycrystalline diamond (PCD) elements and applications utilizing such elements in drilling tools (e.g., inserts, cutting elements, gage trimmers, etc.), machining equipment, bearing apparatuses, wire drawing machinery, and other apparatuses.

BACKGROUND

Polycrystalline diamond compacts ("PDCs"), such as cutting elements used in rock bits or other cutting tools, typically include a cemented tungsten carbide substrate having a layer of superabrasive PCD (also commonly referred to as a diamond table) bonded to a surface of the substrate using an ultra-high pressure, ultra-high temperature ("HPHT") process. Sometimes, the substrate may be brazed or otherwise joined to an attachment member such as a stud or to a cylindrical backing, if desired. A stud carrying a PDC may be used as a subterranean cutting element when mounted to a drill bit by press-fitting, brazing, or otherwise locking the stud into a receptacle formed in the subterranean drill bit or by brazing the cutting element directly into a preformed pocket, socket, or other receptacle formed in the subterranean drill bit. For example, cutter pockets may be formed in the face of a bit formed of cemented tungsten carbide. Generally, a rotary drill bit may include a plurality of PDC superabrasive cutting elements affixed to the drill bit body.

Conventional PDCs are normally fabricated by placing a cemented carbide substrate into a container or cartridge with a volume of diamond crystals or particles positioned on a surface of the substrate. A number of such cartridges may be typically loaded into an ultra-high pressure press. The substrates and volume of diamond particles are then processed under HPHT conditions in the presence of a catalyst material that causes the diamond grains to form and to bond to one another to form a matrix of bonded diamond grains defining a diamond table. The catalyst material is often a solvent catalyst, such as cobalt, nickel, or iron that is used for facilitating the intergrowth of the diamond grains. In one process, a constituent of the substrate, such as cobalt from a cobalt-cemented tungsten carbide substrate, becomes liquid and sweeps from the region adjacent to the volume of diamond grains and into interstitial regions between the diamond grains during the HPHT process. The cobalt acts as a catalyst to facilitate the intergrowth process between the diamond grains, which results in bonds between adjacent diamond grains. Often, a solvent catalyst may be mixed with the diamond particles prior to subjecting the diamond particles and the substrate to the HPHT process.

As known in the art, the solvent catalyst may dissolve carbon from the diamond particles or portions of the diamond particles that graphitize due to the high temperatures being used. The solubility of the stable diamond phase in the solvent catalyst is lower than that of the metastable graphite under HPHT conditions. As a result of this solubility difference, the undersaturated graphite tends to dissolve into solvent catalyst and the supersaturated diamond tends to deposit onto existing diamond grains to form diamond-to-diamond bonds. Accordingly, diamond grains become mutually bonded to form a matrix of PCD with interstitial regions between the bonded diamond grains being occupied by the solvent catalyst.

However, the presence of the solvent catalyst in the diamond table can lead to a diamond table that may be thermally damaged at elevated temperatures. For example, the difference in thermal expansion coefficient between the diamond grains and the solvent catalyst is believed to lead to chipping or cracking in the PDC during drilling or cutting operations, which consequently can degrade the mechanical properties of the PDC or cause failure. Additionally, it is believed that some of the diamond grains can undergo a chemical breakdown or back-conversion with the solvent catalyst. Of course, at extremely high temperatures, diamond may transform to carbon monoxide, carbon dioxide, graphite, or combinations thereof degrading the mechanical properties of the PDC.

Therefore, there is a still a need for a superabrasive material (e.g., PCD) exhibiting superior mechanical and/or thermal properties (e.g., an increased amount of bonding between superabrasive grains).

SUMMARY

The present invention is directed to superabrasive materials and elements, such as PCD elements, methods of fabricating superabrasive elements, and applications utilizing such elements. One aspect of the present invention is directed to a superabrasive element comprising a mass of polycrystalline diamond including ultra-dispersed diamond grain structures present in an amount greater than zero weight percent and less than about 75 weight percent of the mass of polycrystalline diamond. In one embodiment, the ultra-dispersed diamond grain structures may be present in an amount greater than zero weight percent and less than about 45 weight percent of the mass of polycrystalline diamond.

An additional aspect of the present invention is directed to a method of fabricating a superabrasive element. A mixture including a first type of superabrasive particles comprising ultra-dispersed diamond particles and a second type of superabrasive particles is provided. The ultra-dispersed diamond particles are present in an amount greater than zero weight percent and less than about 75 weight percent of the mixture. The mixture is sintered by application of heat and pressure in an amount sufficient to form the superhard element. In one embodiment, the ultra-dispersed diamond particles may be present in an amount greater than zero weight percent and less than about 45 weight percent of the mixture.

Another aspect of the present invention is directed to a PDC. The PDC includes a substrate and a superabrasive table bonded to the substrate. The superabrasive table includes a mass of polycrystalline diamond comprising ultra-dispersed diamond grain structures present in an amount greater than zero weight percent and less than about 75 weight percent of the mass of polycrystalline diamond. In one embodiment, the ultra-dispersed diamond grain structures may be present in an amount greater than zero weight percent and less than about 45 weight percent of the mass of polycrystalline diamond.

A further aspect of the present invention is directed to a drill bit. The drill bit includes a bit body adapted to engage a subterranean formation during drilling. At least one superabrasive cutting element is affixed to the bit body. The at least one superabrasive cutting element includes a mass of polycrystalline diamond comprising ultra-dispersed diamond grain structures present in an amount greater than zero weight percent and less than about 75 weight percent of the mass of polycrystalline diamond. In one embodiment, the ultra-dispersed diamond grain structures may be present in an amount greater than zero weight percent and less than about 45 weight percent of the mass of polycrystalline diamond.

Yet a further aspect of the present invention is directed to various different apparatuses, such as drilling tools, machining equipment, bearing apparatuses, wire drawing machinery, and other apparatuses that employ the inventive superabrasive elements disclosed herein.

DETAILED DESCRIPTION OF VARIOUS EMBODIMENTS

Figure 1:
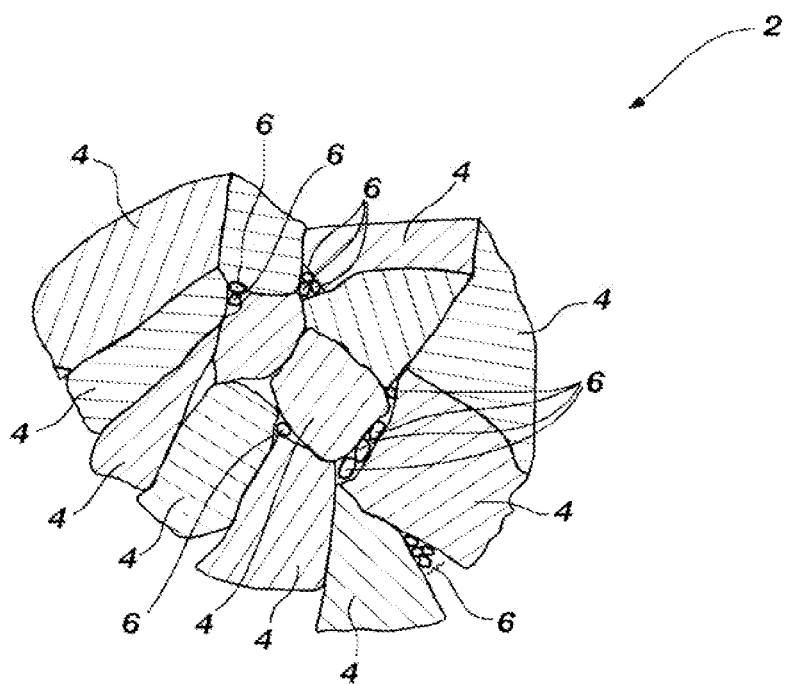
FIG. 1 is a partial, schematic microstructural representation of a sintered superabrasive element in accordance with one embodiment of the present invention.

The present invention is directed to superabrasive (e.g., PCD) elements, methods of fabricating such elements, and applications utilizing such elements. The superabrasive elements disclosed herein may be used in a variety of applications such as drilling tools (e.g., compacts, inserts, cutting elements, gage trimmers, etc.), machining equipment, bearing apparatuses, wire drawing machinery, and other apparatuses. The present invention relates generally to structures comprising at least one superabrasive material (e.g., diamond, boron nitride, silicon carbide, mixtures of the foregoing, or any material exhibiting a hardness exceeding a hardness of tungsten carbide) and methods of manufacturing such structures. More particularly, the present invention relates to a sintered superabrasive mass or volume and methods of manufacturing such a material. As used herein, "superabrasive," means a material exhibiting a hardness exceeding a hardness of tungsten carbide. For example, ultra-dispersed diamond particles may be employed for enhancing polycrystalline diamond. In another example, ultra-dispersed diamond particles may be employed for enhancing a superabrasive material as disclosed in U.S. Pat. No. 7,060,641, the disclosure of which is incorporated herein, in its entirety, by this reference.

Many specific details of certain embodiments of the present invention are set forth in the following description and in FIGS. 1 through 5 in order to provide a thorough understanding of such embodiments. While the embodiments described below reference PCD or PDC material, one skilled in the art will understand that the present invention may have additional embodiments, or that the present invention may be practiced without several of the details described in the following description. In the figures and description below, like or similar reference numerals are used to represent like or similar elements.

Various embodiments of the present invention are directed to sintered superabrasive elements that include a mass of sintered superabrasive particles comprising ultra-dispersed diamond grain structures present in an amount greater than zero weight percent and less than about 75 weight percent of the mass of sintered superabrasive particles. As used herein, "ultra-dispersed diamond particles," also commonly referred to in the art as nanocrystalline diamond particles, means particles each comprising a polycrystalline diamond core surrounded by a metastable carbon shell. Such ultra-dispersed diamond particles may exhibit a particle size of about 1 nm to about 50 nm and more typically, of about 2 nm to about 20 nm, and agglomerates of ultra-dispersed diamond particles may be between about 2 nm to about 200 nm. Ultra-dispersed diamond may be formed by detonating trinitrotoluene explosives in a chamber and subsequent purification to extract diamond particles or agglomerates of diamond particles with the diamond particles generally comprising a polycrystalline diamond core surrounded by a metastable shell, which includes amorphous carbon, carbon onion (i.e., closed shell $sp^2$ nanocarbons), or both. Ultra-dispersed diamond particles are commercially available from ALIT Inc. of Kiev, Ukraine. The present invention contemplates that as a result of, at least in part, utilizing ultra-dispersed diamond particles in the fabrication process for forming a superabrasive material, the sintered superabrasive material (e.g., PCD) may exhibit enhanced bonding between superabrasive (e.g., diamond) grains and, consequently, increased density, thermal stability, and/or other enhanced physical and/or mechanical properties.

In general, as used herein, the term "particle" or variants thereof, refers to the powder employed prior to sintering a superabrasive material. Further, the term "grain" or the phrase "grain structures," or variants thereof, refers to discernible superabrasive regions subsequent to sintering, as known and as determined in the art. The phrase "ultra-dispersed diamond grain structure," as used herein, refers to an ultra-dispersed diamond particle that has been exposed to an HPHT process, without regard to whether the metastable shell exists subsequent to sintering. As used herein, the phrase "HPHT process" means to generate a pressure of at least about 40 kilobar and a temperature of at least about 1000° C.

FIG. 1 shows a partial, schematic microstructural representation of a sintered superabrasive element 2 in accordance with one embodiment of the present invention. The superabrasive element 2 includes coarse diamond grains 4 (represented by the large cross-hatched regions) that are bonded to each other to define grain boundaries. The interstitial regions between adjacent coarse diamond grains 4 are occupied by relatively fine ultra-dispersed diamond grain structures 6 that are bonded to the coarse diamond grains 4 and, depending upon the size of the interstitial regions, other ultra-dispersed diamond grain structures 6. Although not illustrated in FIG. 1, it should be understood that the ultra-dispersed diamond grain structures 6 exhibit a polycrystalline grain structure.

The ultra-dispersed diamond grain structures 6 are present in the superabrasive element 2 in an amount greater than zero weight percent and less than about 75 weight percent, and in a more specific embodiment the ultra-dispersed diamond grain structures 6 are present in an amount less than amount 45 weight percent of the superabrasive element 2. In another embodiment, the ultra-dispersed diamond grain structures 6 may be present in an amount greater than zero weight percent to about 5 weight percent, with the balance at least substantially being the coarse diamond grains 4. In another embodiment, the ultra-dispersed diamond grain structures 6 may be present in an amount greater than zero weight percent to about 4 weight percent, with the balance at least substantially being the coarse diamond grains 4. In another embodiment, the ultra-dispersed diamond grain structures 6 are present in the superabrasive element 2 in an amount from about 0.1 weight percent to about 3 weight percent, and more specifically in an amount from about 0.1 weight percent to about 2 weight percent, with the balance at least substantially being the coarse diamond grains 4. In another specific detailed embodiment, the ultra-dispersed diamond grain structures 6 are present in the superabrasive element 2 in an amount from about 0.1 weight percent to about 1.5 weight percent, and more specifically in an amount from about 0.1 weight percent to about 1 weight percent, with the balance at least substantially being the coarse diamond grains 4. In yet a further detailed embodiment, the ultra-dispersed diamond grain structures 6 are present in the superabrasive element 2 in an amount from about 0.1 weight percent to about 0.5 weight percent, and more specifically in an amount from about 0.1 weight percent to about 0.25 weight percent, with the balance at least substantially being the coarse diamond grains 4. In yet another detailed embodiment, the ultra-dispersed diamond grain structures 6 are present in the superabrasive element 2 in an amount greater than zero to about 0.1 weight percent with the balance at least substantially being the coarse diamond grains 4.

The coarse diamond grains 4 exhibit an average grain size (i.e., sintered) that is greater than the average size of the ultra-dispersed diamond grain structures 6. In a more detailed embodiment, the average grain size of the coarse diamond grains 4 is about 0.5 μm to about 150 μm and the average size of the ultra-dispersed diamond grain structures 6 is about 1 nm to about 50 nm, and, more specifically, about 4 nm to about 30 nm. In another embodiment, the coarse diamond grains 4, the ultra-dispersed diamond grain structures 6, or both may exhibit a bimodal or greater distribution of grain/particle sizes. It should be understood that any of the above ranges of various grain sizes and weight percentages for the coarse diamond grains 4 and the ultra-dispersed diamond grain structures 6 may be combined.

The sintered superabrasive element 2 may exhibit a density of at least about 92 percent of theoretical density and may exceed at least about 98 to at least about 99 percent of theoretical density. The superabrasive element 2 further may exhibit an increased extent of diamond-to-diamond bonding between the coarse diamond grains 4, the ultra-dispersed diamond grain structures 6, or both. The superabrasive element 2, formed of substantially only the coarse diamond grains 4 and ultra-dispersed diamond grain structures 6, may be more thermally stable than a comparative prior art PCD superabrasive element including a solvent catalyst because it does not suffer from deleterious problems commonly experienced when a solvent catalyst is used. However, in some embodiments, a solvent catalyst (e.g., cobalt, nickel, or iron) may also be employed, in at least small amounts, to promote intergrowth of the diamond grains 4 and the ultra-dispersed diamond grain structures 6 and will be present in the interstitial regions between the coarse diamond grains 4, the ultra-dispersed diamond grain structures 6, or both. However, such an embodiment may have a comparatively reduced thermal stability.

However, the present invention also contemplates that if the superabrasive element 2 is formed with both ultra-dispersed diamond particles and a catalyst, at least a portion of the catalyst may be subsequently (i.e., after sintering) removed from the PCD element. For example, subsequent to sintering, a catalyst material may be at least partially removed (e.g., by acid-leaching, by a method as otherwise known in the art, or by any suitable method) from at least a portion of a mass of polycrystalline diamond (e.g., a table formed upon a substrate). Catalyst removal may be substantially complete to a selected depth from an exterior surface of the polycrystalline diamond table, if desired, without limitation. Thus, at least a portion of a polycrystalline diamond mass may be substantially free of a catalyst employed during sintering of the polycrystalline diamond mass. As known in the art, at least partial catalyst removal may provide a polycrystalline diamond material with increased thermal stability, which may also beneficially affect the wear resistance of the polycrystalline diamond material.

The superabrasive elements disclosed herein may be fabricated in accordance with various embodiments. For example, referring to FIG. 2, in one embodiment of a method of the present invention, a mixture 8 is formed by mixing at least one type of superabrasive (e.g., diamond) particle formed of relatively coarse superabrasive particles 10 with a selected amount of relatively fine ultra-dispersed diamond particles 12. The ultra-dispersed diamond particles 12 may be thoroughly cleaned prior to forming the mixture 8 by heating the ultra-dispersed diamond particles 12 in a vacuum furnace for a sufficient time and temperature. The size of the coarse superabrasive particles 10 and the ultra-dispersed diamond particles 12 may be selected so that most of the interstitial regions 14 between the coarse superabrasive particles 10 are occupied by one or more of the ultra-dispersed diamond particles 12. In one embodiment, the superabrasive particles 10 may comprise diamond (e.g., diamond powder or grit). As known in the art, the mixture 8 may be placed in a pressure transmitting medium such as a refractory metal can, graphite structure, pyrophyllite or other pressure transmitting structures, or other containers or supporting elements. The pressure transmitting medium, including the mixture 8, is subjected to an HPHT sintering process using an ultra-high pressure press at process conditions of, for example, a pressure of at least about 40 kilobar to at least about 70 kilobar and a temperature of at least about 1000° C. to at least about 1600° C. for a time sufficient to consolidate the mixture and form a coherent mass of bonded diamond shown in FIG. 1 as the superabrasive element 2.

Figure 2:
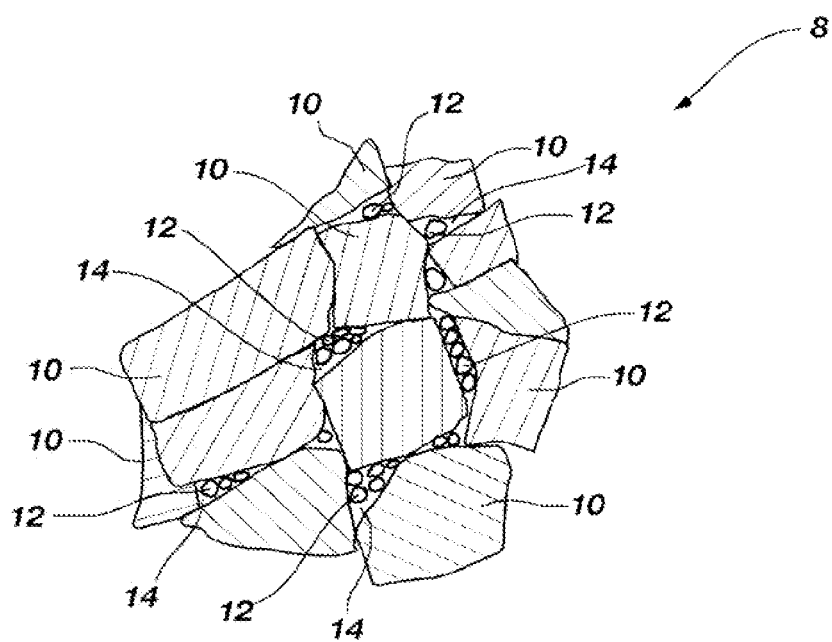
FIG. 2 is a partial, schematic microstructural representation of a mixture of a first type of superabrasive particles formed of relatively coarse superabrasive particles and a second type of superabrasive particles formed of ultra-dispersed diamond particles that are used to fabricate the superabrasive element of FIG. 1 in accordance with one embodiment of a method of the present invention.

During the HPHT sintering process, the coarse superabrasive particles 10 of the mixture 8 that are in contact with each other will become bonded to each other. As previously discussed, most of the ultra-dispersed diamond particles 12 may occupy the interstitial regions 14 between the coarse superabrasive particles 10. Although the physical phenomenon is not entirely understood, it is currently believed by the inventor that the amorphous carbon, the carbon onion, or both in the ultra-dispersed diamond particles 12 undergo a phase transformation to diamond and bond to the coarse superabrasive particles 10. Thus, it is believed that the amorphous carbon and/or the carbon onions present in the ultra-dispersed diamond particles 12 are not stable phases at the pressures and temperatures used in the HPHT process. Of course, as shown in FIG. 2, the interstitial regions 14 may include more than one of the ultra-dispersed diamond particles 12 disposed therein. Consequently, as depicted in FIG. 1, the interstitial regions between the coarse diamond grains 4 may include a plurality of ultra-dispersed diamond grain structures 6 bonded to each other. As discussed above, by forming the superabrasive element 2 using the coarse superabrasive particles 10 and the metastable ultra-dispersed diamond particles 12 selected to fit into the interstitial regions 14, the resulting sintered superabrasive element 2 (FIG. 1) may exhibit enhanced bonding between diamond grains and may exhibit a density close to theoretical density, increased thermal stability, or other enhanced physical and/or mechanical properties.

Prior to sintering, in one embodiment, the coarse superabrasive particles 10 may exhibit an average size of about 0.5 μm to about 150 μm and the ultra-dispersed diamond particles 12 may exhibit an average size of about 1 nm to about 50 nm, with agglomerates of the ultra-dispersed diamond particles 12 being about 2 nm to about 200 nm.

In accordance with one detailed embodiment, mixture 8 may comprise ultra-dispersed diamond particles 12 in an amount greater than zero weight percent and less than about 75 weight percent, and more specifically in an amount less than about 45 weight percent, with the balance being the coarse superabrasive particles 10. In another embodiment, the mixture 8 may comprise ultra-dispersed diamond particles 12 in an amount greater than zero weight percent and less than about 5 weight percent, and more specifically in an amount greater than zero weight percent to about 4 weight percent, with the balance being the coarse superabrasive particles 10. In a more detailed embodiment, the ultra-dispersed diamond particles 12 are present in the mixture 8 in an amount from about 0.1 weight percent to about 3 weight percent, and more specifically in an amount from about 0.1 weight percent to about 2 weight percent, with the balance being the coarse superabrasive particles 10. In another more detailed embodiment, the ultra-dispersed diamond particles 12 are present in the mixture 8 in an amount from about 0.1 weight percent to about 1.5 weight percent, and more specifically in an amount from about 0.1 weight percent to about 1 weight percent, with the balance being the coarse diamond particles 10. In yet a more specific detailed embodiment, the ultra-dispersed diamond particles 12 are present in the mixture 8 in an amount from about 0.1 weight percent to about 0.5 weight percent, and more specifically in an amount from about 0.1 weight percent to about 0.25 weight percent, with the balance being the coarse superabrasive particles 10. In yet another more specific detailed embodiment, the ultra-dispersed diamond particles 12 are present in the mixture 8 in an amount greater than zero weight percent to about 0.1 weight percent with the balance being the coarse superabrasive particles 10.

In another more detailed embodiment, the coarse superabrasive particles 10 of the mixture 8 may exhibit a bimodal or greater distribution of particle sizes. For example, the mixture 8 may include ultra-dispersed diamond particles 12 in an amount of about 0.1 weight percent to less than about 5 weight percent of the mixture 8 with the balance being coarse superabrasive particles 10. The formulation of the coarse superabrasive particles 10 may be about 75 weight percent to about 99 weight percent diamond particles with an average size of about 10 μm to about 40 μm and the balance being diamond particles exhibiting an average size of about 1 μm to about 10 μm. It should be understood that any of the above ranges of various sizes and weight percentages for the coarse superabrasive particles 10 and the ultra-dispersed diamond particles 12 may be combined and processed according to any of the methods disclosed herein (i.e. time, temperature, and pressure parameters). As mentioned above, in one embodiment, superabrasive particles 10 may comprise diamond. In other embodiments, superabrasive particles 10 may comprise boron nitride, silicon carbide, etc., without limitation.

Referring now to both FIGS. 1 and 2, the sintered superabrasive element 2 will exhibit, to a substantial extent, the same or similar grain/particle size as the grain/particle size and relative weight percentages of the precursor materials used (i.e., the coarse superabrasive particles 10 and ultra-dispersed diamond particles 12). Additionally, some carbon phases present in the ultra-dispersed diamond particles 12 may be present in the final sintered superabrasive element 2 in detectable small amounts. Such phases include small amounts of amorphous carbon, carbon onion, or both that are not transformed to diamond or otherwise transformed during the HPHT sintering process.

Figure 3:
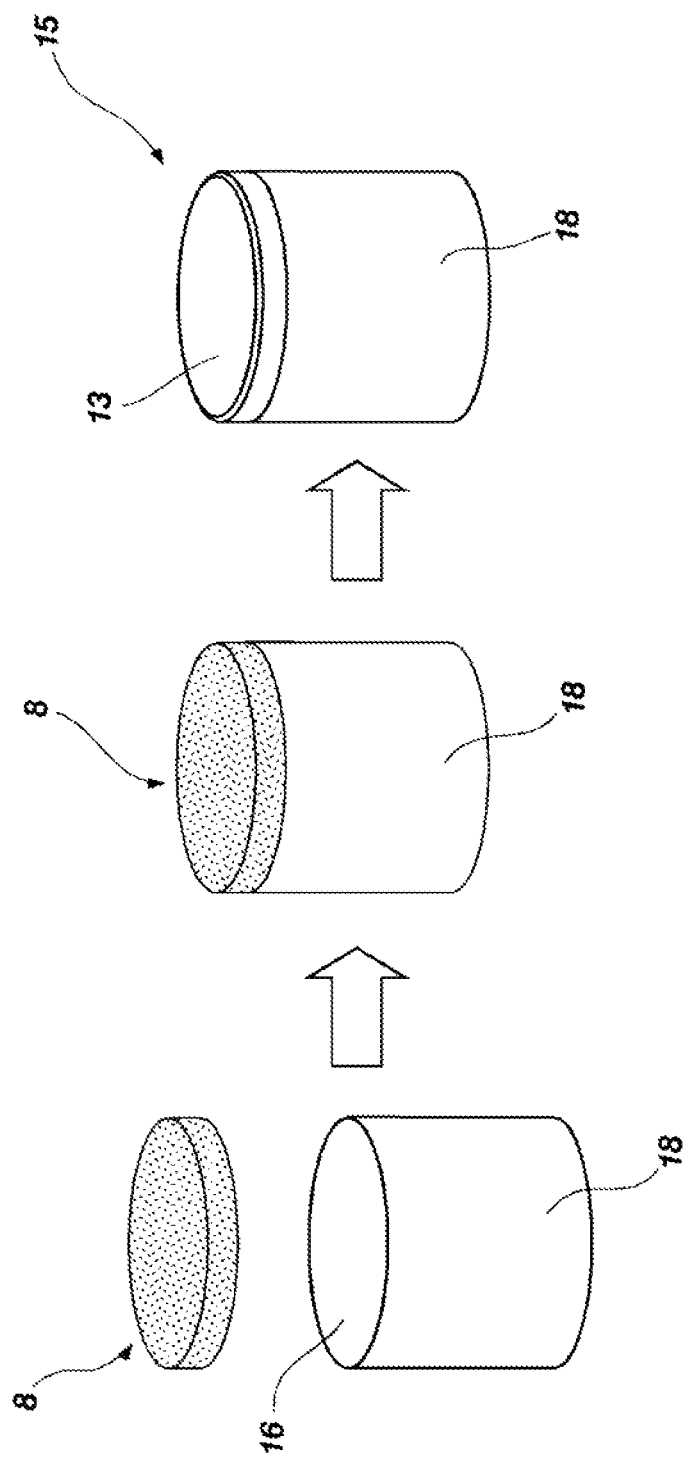
FIG. 3 is a schematic diagram illustrating a method for fabricating a superabrasive element on a substrate in accordance with one embodiment of the present invention.

In many applications, it may be desirable to form the superabrasive element 2 on a substrate. For example, in one embodiment, the superabrasive element 2 may comprise a PDC cutting element. FIG. 3 shows a schematic illustration of the process for forming any of the superabrasive elements 2 disclosed herein on a substrate to form a PDC cutting element. With reference to FIG. 3, the mixture 8 of the coarse superabrasive particles 10 and ultra-dispersed diamond particles 12 is positioned adjacent to an interfacial surface 16 of a suitable substrate 18. As shown in FIG. 3, in one embodiment, substrate 18 may be generally cylindrical. More generally, the substrate 18 may comprise any selected shape and size, without limitation. Although FIG. 3 shows the interfacial surface 16 as being substantially planar, the interfacial surface 16 may exhibit a selected nonplanar topography, without limitation. The substrate 18 may comprise, for example, cobalt-cemented tungsten carbide or another suitable material. Other materials that may be used for the substrate 18 include, without limitation, cemented carbides including titanium carbide, niobium carbide, tantalum carbide, vanadium carbide, iron, nickel, and combinations thereof. The mixture 8 and the substrate 14 may be subjected to an HPHT sintering process to form a superabrasive table 13 (e.g., a PCD table) bonded to the interfacial surface 16 of substrate 18 to form an element suitable for use as a cutting element 15 (e.g., a PDC cutting element).

As previously discussed, a catalyst material (e.g., cobalt, nickel, iron, alloys of the foregoing, etc.) may be employed for promoting intergrowth between the coarse superabrasive particles 10, the ultra-dispersed diamond particles 12, and/or intergrowth between the coarse superabrasive particles grains 10 and the ultra-dispersed diamond particles 12. For example, if superabrasive particles 10 comprise diamond, when the mixture 8 is placed adjacent to, for example, a cobalt-cemented tungsten carbide substrate 18 and subjected to the HPHT sintering process, molten cobalt may wick or sweep into the mixture 8 from the substrate 18. Such cobalt may remain in the superabrasive (e.g., PCD) table 13 upon sintering and cooling. One specific embodiment of a non-cobalt catalyst is the INVAR® alloy. In other embodiments, a catalyst may be provided prior to sintering, as a layer of material between the substrate 18 and the mixture 8, within the mixture 8 as a powder, or as otherwise known in the art. Of course, when the superabrasive table 13 includes a catalyst material, the thermal stability may be lower compared to when the superabrasive table 13 is fabricated without the catalyst material. Moreover, such a catalyst material may be at least partially removed (e.g., by acid-leaching or as otherwise known in the art) from at least a portion of the superabrasive table 13 to a selected depth from an exterior surface of the superabrasive table 13, if desired Still, in other embodiments, the superabrasive table 13 may be sintered and, subsequently, bonded to the substrate 18 by brazing, using an HPHT process, or any other suitable joining technique, without limitation.

Figure 4:
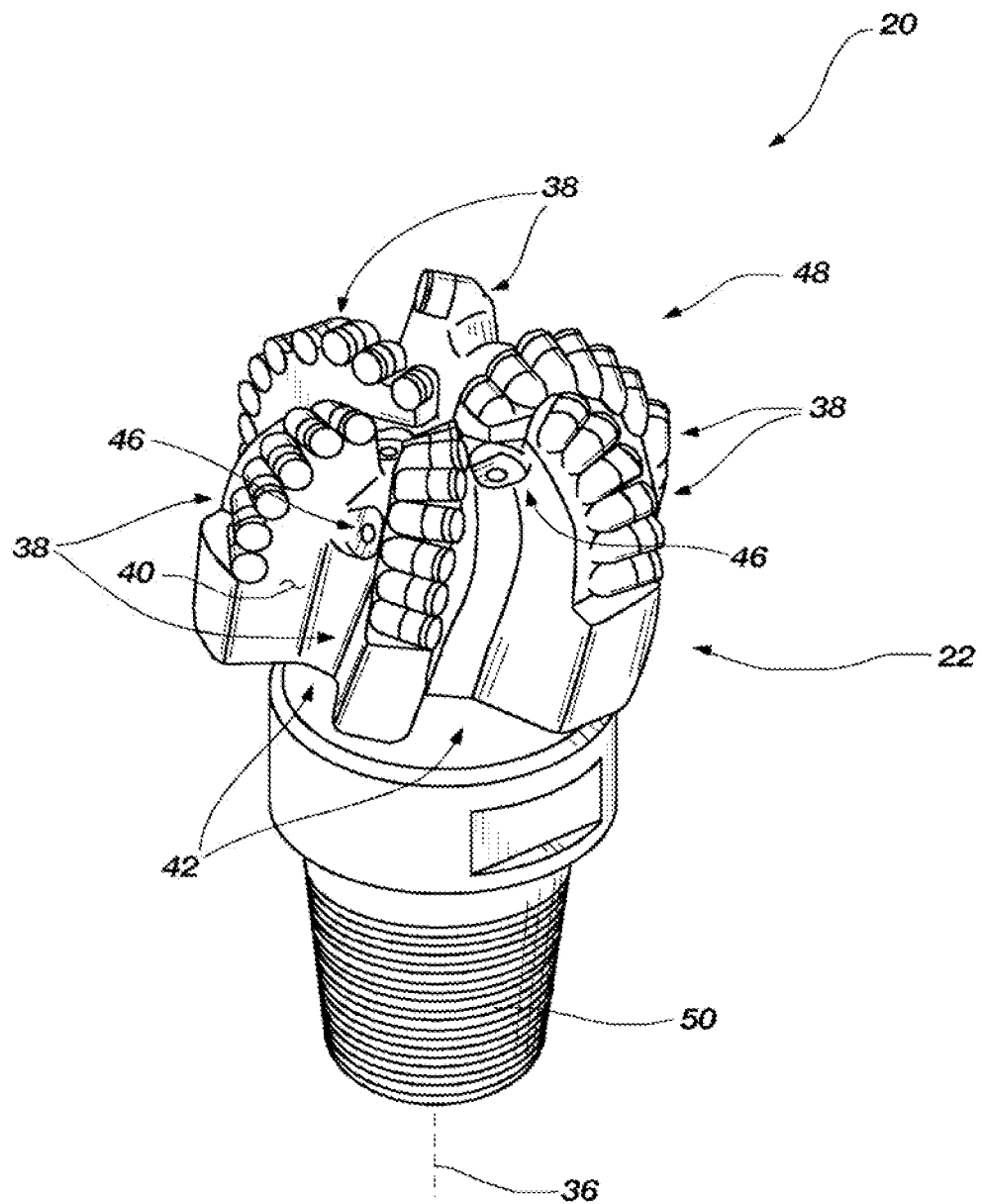
FIG. 4 is an isometric view of one embodiment of a rotary drill bit including at least one cutting element comprising a superabrasive element fabricated and structured in accordance with embodiments of the present invention.
Figure 5:
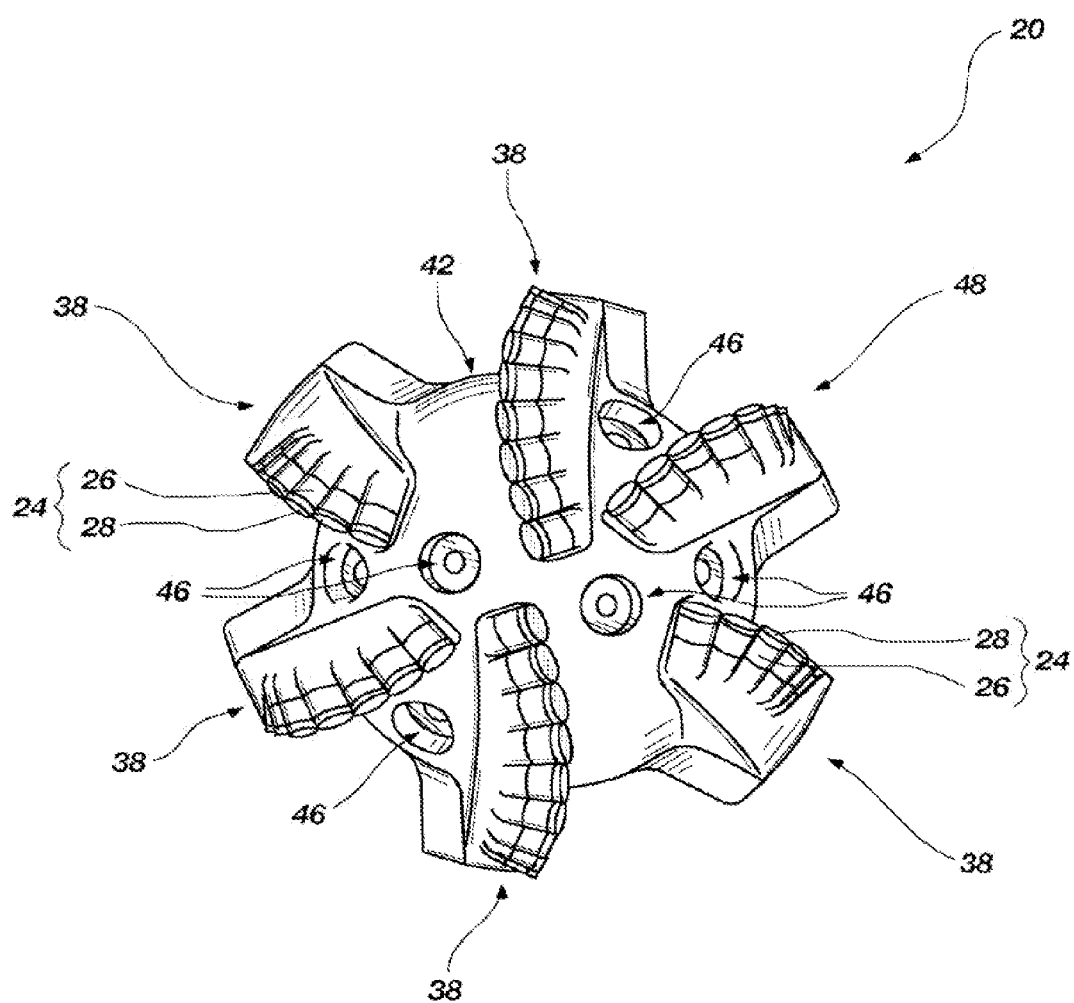
FIG. 5 shows a top elevation view of the rotary drill bit of FIG. 4.

FIGS. 4 and 5 show an isometric view and a top elevation view, respectively, of a rotary drill bit 20 in accordance with one embodiment of the present invention. The rotary drill bit 20 includes at least one superabrasive cutting element manufactured in accordance with embodiments of the present invention. The rotary drill bit 20 includes a bit body 22 including radially and longitudinally extending blades 38 with leading faces 40, and a threaded pin connection 50 for connecting the bit body 22 to a drilling string. The bit body 22 defines a leading end structure for drilling into a subterranean formation by rotation about a longitudinal axis 36 and application of weight-on-bit. In one embodiment, at least one superabrasive cutting element comprising polycrystalline diamond may be affixed to rotary drill bit 20. For example, as best shown in FIG. 5, a plurality of cutting elements 24 are secured to the blades 38, each cutting element 24 including a PCD table 28 bonded to a substrate 26. The PCD tables 28 and substrates 26 may be fabricated and structured in accordance with any of the disclosed embodiments. More generally, the diamond tables 28 may comprise any superabrasive encompassed by the instant disclosure, without limitation. In addition, if desired, in some embodiments, some of the cutting elements 24 may be conventional in construction, if desired. Also, circumferentially adjacent blades 38 define so-called junk slots 42 therebetween, as known in the art. Additionally, the rotary drill bit 20 includes a plurality of nozzle cavities 46 for communicating drilling fluid from the interior of the rotary drill bit 20 to the cutting elements 24.

FIGS. 4 and 5 merely depict one embodiment of a rotary drill bit that employs at least one cutting element including a superabrasive element fabricated and structured in accordance with the disclosed embodiments, without limitation. The drill bit 20 is used to represent any number of earth-boring tools or drilling tools, including, for example, core bits, roller-cone bits, fixed-cutter bits, eccentric bits, bicenter bits, reamers, reamer wings, or any other downhole tool including superabrasive cutting elements or inserts, without limitation.

The superabrasive elements disclosed herein may also be utilized in applications other than cutting technology. The embodiments of superabrasive elements disclosed herein may be used in wire dies, bearings, artificial joints, inserts, cutting elements, and heat sinks Thus, any of the superabrasive elements formed by the methods disclosed herein may be employed for forming an article of manufacture including at least one superabrasive element.

Thus, the embodiments of superabrasive elements disclosed herein may be used on any apparatus or structure in which at least one conventional PCD element is typically used. In one embodiment, a rotor and a stator (i.e., a thrust bearing apparatus) may each include a superabrasive element according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing PCD elements disclosed herein may be incorporated. The embodiments of superabrasive elements disclosed herein may also form all or part of heat sinks, wire dies, bearing elements, cutting elements, cutting inserts (e.g., on a roller cone type drill bit), machining inserts, or any other article of manufacture as known in the art. Other examples of articles of manufacture that may use any of PCD elements disclosed herein are disclosed in U.S. Pat. Nos. 4,811,801; 4,274,900; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

The following working examples of the present invention set forth various formulations that have been used to form PDC cutting elements. The following working examples provide further detail in connection with the specific embodiments described above.

COMPARATIVE EXAMPLE 1

A conventional PDC was formed from a mixture of coarse diamond particles being in excess of about 90 weight percent of the mixture with the balance being relatively fine diamond particles. The coarse diamond particles exhibit an average particle size about ten times the average particle size of the relatively fine diamond particles of the mixture. The mixture contained no ultra-dispersed diamond particles. The mixture was placed adjacent to a cobalt-cemented tungsten carbide substrate. The mixture and substrate were placed in a niobium can and sintered at a temperature of about 1400° C. and about 69 kilobar for about 90 seconds to form the conventional PDC. The thermal stability of the as-formed conventional PDC was evaluated by measuring the distance cut in a granite workpiece prior to failure without using coolant. The distance cut is considered representative of the thermal stability of the PDC. The conventional PDC was able to cut a distance of only 1643 linear feet in the granite workpiece.

EXAMPLE 2

A mixture was formed of about 0.1 weight percent ultra-dispersed diamond particles with the balance comprising the same diamond formulation as example 1. The mixture was placed adjacent to a cobalt-cemented tungsten carbide substrate. The mixture and substrate were placed within a niobium can and sintered at a temperature of about 1400° C. and about 69 kilobar for about 90 seconds to form a PDC. The thermal stability of the as-formed PDC was evaluated by measuring the distance cut in a granite workpiece without using coolant. The PDC fabricated in example 2 was able to cut a distance of 2135 linear feet in a granite workpiece compared to the distance of only 1643 linear feet cut by the conventional PDC of example 1. Thus, thermal stability tests indicate that the PDC of example 2 exhibited a significantly improved thermal stability compared to the conventional PDC of comparative example 1. Wear flat volume tests indicated that there was no substantial difference in wear resistance between the PDC of example 2 and the conventional PDC of comparative example 1.

EXAMPLE 3

A mixture was formed of about 1 weight percent ultra-dispersed diamond particles with the balance comprising the same diamond formulation as example 1. The mixture was placed adjacent to a cobalt-cemented tungsten carbide substrate. The mixture and substrate were placed within a niobium can and sintered at a temperature of about 1400° C. and about 69 kilobar for about 90 seconds to form a PDC. The PDC fabricated in example 3 was able to cut a distance of 1868 linear feet in a granite workpiece compared to a distance of only 1643 linear feet cut by the conventional PDC of example 1. Thus, thermal stability tests indicate that the PDC of example 3 also exhibited a significantly improved thermal stability compared to the conventional PDC of example 1. Wear flat volume tests indicated that there was no substantial difference in wear resistance between the PDC of example 3 and the conventional PDC of example 1.

From the foregoing it will be appreciated that, although specific embodiments and working examples of the present invention have been described herein for purposes of illustration, various modifications may be made without deviating from the spirit and scope of the present invention. Accordingly, the present invention is not limited except as by the appended claims. The words "including" and "having," as used herein, including the claims, shall have the same meaning as the word "comprising."

The invention claimed is:

1. A polycrystalline diamond compact, comprising:
    a polycrystalline diamond table including:
        nanocrystalline diamond present in an amount greater than zero weight percent to less than about 45 weight percent of the polycrystalline diamond table, the nanocrystalline diamond exhibiting an average diamond grain size of about 1 nm to about 50 nm;
        an amount of polycrystalline diamond grains including:
        a first amount of polycrystalline diamond grains present in an amount of about 75 weight percent to about 99 weight percent, the first amount of polycrystalline diamond grains exhibiting an average diamond grain size of about 10 µm to about 40 µm;
        a second amount of polycrystalline diamond grains forming the balance of the polycrystalline diamond grains, the second amount of polycrystalline diamond grains exhibiting an average grain size of about 1 µm to about 10 µm; and
        a catalyst material distributed throughout at least a portion thereof; and
    a substrate bonded to the polycrystalline diamond table.

2. The polycrystalline diamond compact of claim 1 wherein the nanocrystalline diamond comprises greater than zero weight percent to about 0.1 weight percent of the polycrystalline diamond table.

3. The polycrystalline diamond compact of claim 1 wherein the nanocrystalline diamond comprises about 0.1 weight percent to about 0.5 weight percent of the polycrystalline diamond table.

4. The polycrystalline diamond compact of claim 1 wherein the nanocrystalline diamond comprises greater than zero weight percent to about 1 weight percent of the polycrystalline diamond table.

5. The polycrystalline diamond compact of claim 1 wherein the nanocrystalline diamond comprises greater than zero weight percent to about 1.5 weight percent of the polycrystalline diamond table.

6. The polycrystalline diamond compact of claim 1 wherein the nanocrystalline diamond comprises greater than zero weight percent to about 2 weight percent of the polycrystalline diamond table.

7. The polycrystalline diamond compact of claim 1 wherein the nanocrystalline diamond comprises ultra-dispersed diamond grain structures.

8. The polycrystalline diamond compact of claim 1 wherein the nanocrystalline diamond comprises a residual amount of at least one member selected from the group consisting of amorphous carbon and carbon onion.

9. The polycrystalline diamond compact of claim 1 wherein a region of the polycrystalline diamond table is substantially free of the catalyst material.

10. The polycrystalline diamond compact of claim 1 wherein the polycrystalline diamond table is capable of cutting a distance of at least 1868 linear feet in a granite workpiece during a vertical turret lathe thermal stability test.

11. The polycrystalline diamond compact of claim 1 wherein the catalyst material comprises a metal-solvent catalyst.

12. The polycrystalline diamond compact of claim 1 wherein substrate comprises a cemented carbide substrate.

13. A rotary drill bit, comprising:
    a bit body adapted to engage a subterranean formation during drilling; and
    a plurality of polycrystalline diamond cutting elements affixed to the bit body, wherein at least one of the polycrystalline diamond cutting elements comprises the polycrystalline diamond compact according to claim 1.

14. The rotary drill bit of claim 13 wherein a region of the polycrystalline diamond table is substantially free of the catalyst material.

15. The rotary drill bit of claim 13 wherein the polycrystalline diamond table is capable of cutting a distance of at least 1868 linear feet in a granite workpiece during a vertical turret lathe thermal stability test.

16. A polycrystalline diamond compact, comprising:
    a polycrystalline diamond body including:
        nanocrystalline diamond present in an amount greater than zero weight percent to less than about 45 weight percent of the polycrystalline diamond body, the nanocrystalline diamond exhibiting an average diamond grain size of about 1 nm to about 50 nm;
        an amount of polycrystalline diamond grains including:
        a first amount of polycrystalline diamond grains present in an amount of about 75 weight percent to about 99 weight percent, the first amount of polycrystalline diamond grains exhibiting an average diamond grain size of about 10 µm to about 40 µm; and
        a second amount of polycrystalline diamond grains forming the balance of the polycrystalline diamond grains, the second amount of polycrystalline diamond grains exhibiting an average grain size of about 1 µm to about 10 µm;
        a catalyst material distributed throughout at least a portion thereof.

17. The polycrystalline diamond compact of claim 16 wherein a region of the polycrystalline diamond body is substantially free of the catalyst material.

18. A rotary drill bit, comprising:
    a bit body adapted to engage a subterranean formation during drilling; and
    a plurality of polycrystalline diamond cutting elements affixed to the bit body, wherein at least one of the polycrystalline diamond cutting elements comprises the polycrystalline diamond compact according to claim 16.

19. A polycrystalline diamond compact, comprising:
    a polycrystalline diamond body including a catalyst material distributed throughout at least a portion thereof, the polycrystalline diamond body fabricated according to a process comprising:
        mixing a plurality of $sp^2$-carbon-containing particles and a plurality of diamond particles to form a mixture; and
        sintering the mixture in the presence of the catalyst material to form the polycrystalline diamond body;

wherein the plurality of $sp^2$-carbon-containing particles was present in the mixture in an effective amount such that the polycrystalline diamond body is capable of cutting a distance of at least 1868 linear feet in a granite workpiece during a vertical turret lathe thermal stability test without removal of the catalyst material from the polycrystalline diamond body.

20. The polycrystalline diamond compact of claim 19 wherein the distance is at least 2135 linear feet.

21. The polycrystalline diamond compact of claim 19 wherein at least a portion of the plurality of $sp^2$-carbon-containing particles comprise a plurality of nanocrystalline diamond particles.

22. The polycrystalline diamond compact of claim 19 wherein at least a portion of the plurality of $sp^2$-carbon-containing particles comprise a plurality of ultra-dispersed diamond particles.

23. The polycrystalline diamond compact of claim 19 wherein the amount of the plurality of $sp^2$-carbon-containing particles is greater than zero to about 5 weight percent of the mixture.

24. The polycrystalline diamond compact of claim 19 wherein the amount of the $sp^2$-carbon-containing particles is greater than zero weight percent to about 1 weight percent of the mixture.

25. The polycrystalline diamond compact of claim 19 wherein the amount of the plurality of $sp^2$-carbon-containing particles is greater than zero weight percent to about 2 weight percent of the mixture.

* * * * *